Sept. 16, 1930. A. J. D. OHM Re. 17,809

LIGHTING FIXTURE

Original Filed Sept. 7, 1928

Witnesses
Milton Lenoir
H. O. Flowell

Inventor
Albert J. D. Ohm,
By George Heidmann,
Attorney

Reissued Sept. 16, 1930

Re. 17,809

UNITED STATES PATENT OFFICE

ALBERT J. D. OHM, OF OAK PARK, ILLINOIS, ASSIGNOR TO THE BEARDSLEE CHANDELIER MANUFACTURING COMPANY, A CORPORATION OF DELAWARE

LIGHTING FIXTURE

Original No. 1,737,265, dated November 26, 1929, Serial No. 304,405, filed September 7, 1928. Application for reissue filed July 2, 1930. Serial No. 465,420.

This invention relates to lighting fixtures, and, while it can be adapted for a variety of fixtures, it is particularly useful in connection with wall brackets and similar fixtures.

The object of the invention is to provide novel and simple means for mounting a shade on the fixture in a secure manner.

A further object of the invention is to provide means for detachably securing the shade on the fixture so that the shade may be readily and quickly detached at any time for cleaning or other purposes and as quickly and easily engaged with and mounted on the fixture, without requiring the manipulation of any screws or other devices.

In the accompanying drawings, I have shown a selected embodiment of the invention in a wall bracket, and referring thereto Figure 1 is a sectional elevation.

Figure 1:
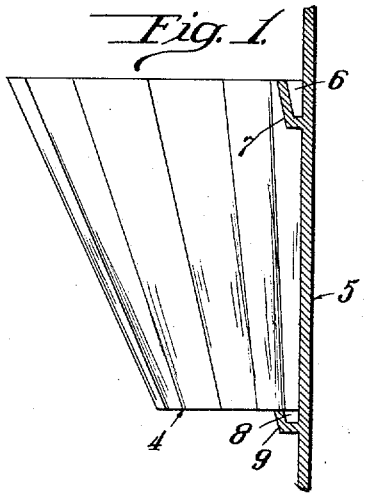
Figure 3:
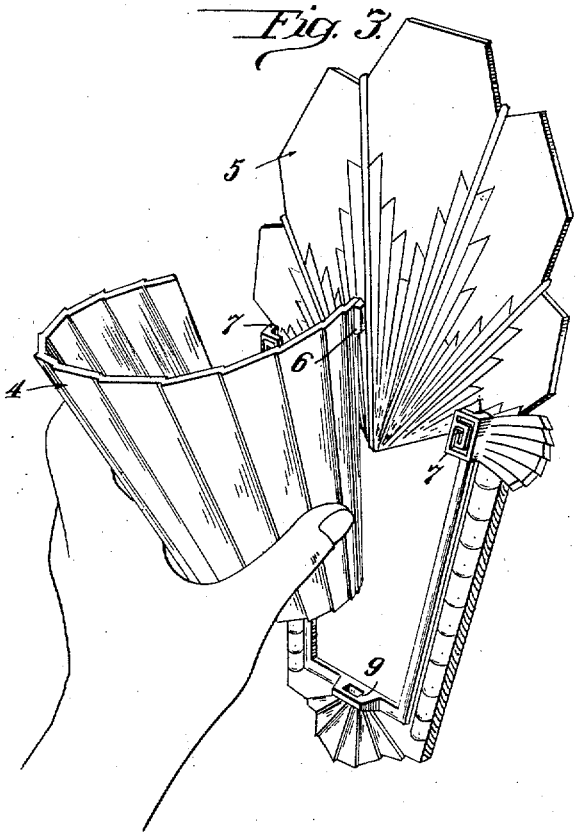
Figure 3 is a perspective view showing the shade about to be engaged with or disengaged from the fixture.
Figure 2:
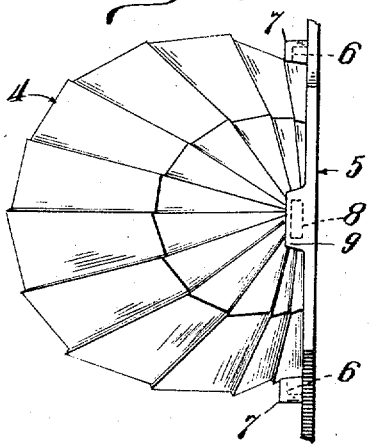
Figure 2 is a bottom plan view.

Referring to the drawing, 4 is the shade and 5 is the plate of the fixture. These parts may be made in any form, size, design, and construction, and it will be understood that the drawings merely illustrates a simple embodiment of the invention and are not intended to restrict the invention to the particular form, construction, and design shown. My invention relates more particularly to a fixture wherein the glassware or shade is of what may be called an open back type, which may or may not be provided with a closed bottom. In the specific exemplification the shade is provided with side lugs 6, 6 at the top to engage retainers 7, 7 on the plate 5, and the shade also has a bottom lug 8 to engage a retainer 9 on the plate.

In employing the word plate I refer to the metal portion or frame element of the fixture whether of the wall bracket type or other type of lighting fixture.

The retainers 7, 7 may be made in the form of side pockets, open at the top and inner sides, and adapted to receive the integral lugs 6, 6, as shown; the bottom retainer 9 may be made in the form of a pocket shaped to receive the integral lug 8 on the bottom of the shade. The retaining means enables the shade to be easily engaged with and disengaged from the plate of the fixture whenever and as often as desired for purposes of cleaning and any other purposes.

My invention relates to a fixture wherein the glassware or shade is open at back and is disposed away from the plate or supporting fixture frame element and particularly to a fixture wherein the glassware or shade tapers toward one end and especially wherein the upper part of the shade overhangs the bottom thereof as shown in the drawing, and the shade is supported and held in place on the fixture frame element by the interengaging means on the shade and fixture plate, whose interengaging relation is obtained or released through vertical movement of the shade relative to the front face of the plate or fixture frame element. That is to say, the interengaging relation is maintained through the downward movement of the shade substantially parallel with the face of the plate or fixture frame.

The invention is particularly useful with a shade open at the back like or substantially like the shade 4, and with a fixture having a supporting plate to form a backing for the open back shade and provided with retaining means to receive the lugs or extensions integral with the rear marginal edges of the shade so that the latter will be held snugly, tightly, and firmly upon and against the plate.

As before stated, the shade and the fixture may be variously constructed, the forms shown in the drawings being selected for illustration and not for limiting the invention thereto; therefore I reserve the right to make all such changes in the form, construction, size, and arrangement of design of the shade and fixture within the scope of the following claims.

I claim:

1. A lighting fixture comprising a support having tapered retaining means thereon, and a shade having an open back and rigid wedge shaped lugs to engage said retaining means for hanging and locking the shade on the support.

2. A lighting fixture comprising a support having retaining means disposed thereon, and a gravity-supported shade open at the back and having a lug at the bottom and a lug at each rear edge to engage said retaining means for hanging the shade on the support.

3. A lighting fixture comprising a plate support having pocket retaining means thereon, and a shade having an open back adapted to fit with its rear edges against said plate, and said shade having a lug at the bottom and a lug at each rear edge to engage said retaining means for hanging the shade on the plate.

4. A lighting fixture comprising an open back shade tapering toward the bottom and provided at its rear marginal edges with integral portions disposed laterally beyond the perimeter of the shade; and a support tapering toward the bottom and provided on its front face with integral off-set portions adapted to extend parallel with the path of said laterally disposed portions of the shade, said support portions providing sockets open at the top and sides; the shade portions and the support portions being formed to taper toward the bottom of the fixture, the portions of the shade being adapted to interengage with the portions on the support through downward movement of the shade parallel with the front face of the support.

5. A lighting fixture of the character described comprising a support member and a gravity seating single piece shade; the outer face of the support member and the opposite outer vertical sides of the shade having interengaging off-set portions disposed in a direction lengthwise of the shade and converging toward the bottom, whereby the shade is hung in place through downward movement of the shade parallel with the front face of the support member and locked in place by said converging interengaging portions.

ALBERT J. D. OHM.